United States Patent [19]

Watanabe

[11] Patent Number: 5,279,408
[45] Date of Patent: Jan. 18, 1994

[54] ICE LIFT APPARATUS
[75] Inventor: Takashi Watanabe, Nagoya, Japan
[73] Assignee: Hoshizaki Denki Kabushiki Kaisha, Toyoake City, Japan
[21] Appl. No.: 938,011
[22] Filed: Aug. 28, 1992
[51] Int. Cl.⁵ .............................................. B65G 19/14
[52] U.S. Cl. .................................. 198/716; 198/735.1; 62/344
[58] Field of Search .................. 198/397, 550.12, 607, 198/728, 735.1, 735.3; 62/344

[56] References Cited

U.S. PATENT DOCUMENTS

| | | | |
|---|---|---|---|
| 3,190,433 | 6/1965 | Blankschein | 198/397 |
| 3,275,121 | 9/1966 | Mueller | 198/397 |
| 3,651,923 | 3/1972 | Anderson et al. | 198/550.12 |
| 3,835,985 | 9/1974 | Johnson | 198/397 |
| 3,924,732 | 12/1975 | Leonard | 198/397 |
| 5,105,631 | 4/1992 | Watanabe et al. | 198/735.1 |

Primary Examiner—Joseph E. Valenza
Attorney, Agent, or Firm—Brooks Haidt Haffner & Delahunty

[57] ABSTRACT

An ice lift apparatus receives prismatic ice cubes having a substantially uniform predetermined rectangular or prism shape of which the longest side has a length D and which transports the prismatic ice cubes upwardly along a vertical ice transporting section. The ice lift apparatus comprises an endless transporting member provided with a number of transverse bars at a predetermined space therebetween that mounted so as to be capable of running circulatively along the vertical ice transporting section, and a supporting guide plate disposed along a climbing path of the transverse bars with a predetermined distance L therefrom, wherein the predetermined distance L between the climbing path of the transverse bars and the supporting guide plate is so selected as to fall within a range of ½ to ⅔ of the length D of the longest side of the ice cube or exceed the range. Ice chips of a size short of the lower limit of the above range are sorted out.

6 Claims, 4 Drawing Sheets

FIG. I

ICE LIFT APPARATUS

CROSS-REFERENCE TO RELATED APPLICATIONS

The present application relates to U.S. patent application Ser. No. 622,950 filed Dec. 6, 1990, entitled "ICE LIFT APPARATUS" and issued as U.S. Pat. No. 5,105,631 on Apr. 21, 1992.

BACKGROUND OF THE INVENTION

1. Field of the Invention

The present invention relates to an ice lift apparatus for conveying or transporting vertically upwardly ice cubes of a substantially uniform shape such as rectangular prisms, cubes, that is prismatic ice blocks, particularly those made by an ice making machine among others.

2. Description of the Prior Art

In automatic ice making machines known heretofore, an ice storage box or chamber is provided with a front door for allowing ice cubes or blocks (hereinafter collectively referred to as ice cubes) to be taken out from the chamber by opening the front door. To this end, a scoop or the like tool is generally employed. However, not a little labor is imposed on the person in taking out the ice cubes although this depends on the position of the front door.

Under the circumstances, it has already been proposed to install an ice lift apparatus within the ice storage chamber with a view to making it possible to take out the ice cubes from the ice storage chamber through a delivery port provided at the top thereof. In that case, transportation of the ice cubes to the delivery or exit port is realized by using a conveyor apparatus (as disclosed in Japanese Utility Model Application Laid-Open No. 26162/1972) or a bucket elevator (as disclosed in Japanese Utility Model Application Laid-Open No. 77742/1973). As the conventional ice lift apparatus for transporting vertically upwardly the broken ice cubes which is employed in applications other than in ice making machines, there may be mentioned a screw type conveying apparatus (see Japanese Utility Model Application Laid-Open No. 130675/1981) and an ice scraping/feeding apparatus including a pair of endless conveyor members having a large number of raking means mounted thereon (refer to Japanese Patent Publication No. 11792/1985).

However, in a prior art ice transporting apparatuses in which conveyor means are made use of, not only are difficulties encountered in vertically transporting the ice cubes upwardly in a satisfactory manner but also a lot of space is required for installing the transporting apparatus. More specifically, in the case of an ice transporting apparatus in which the buckets or raking means are mounted on a pair of endlessly moving conveyor chains, the buckets which project from the endless conveyor chains require additional room, making it difficult to install the ice lift apparatus within a narrow space such as in the ice storage chamber of an ice making machine.

It is further noted that although the prismatic ice cubes are in a normal state with relatively uniform size and shape immediately after having been made by the ice making machine, the ice cubes are likely to melt in the course of time even when the prismatic ice cubes are stored or accumulated within an ice storage chamber combined integrally with the ice making machine or in an ice storage box provided separately from the ice making machine. As a result, the size of the ice cubes is reduced with the shape becoming irregular and being transformed into so-called ice chips. Also, the prismatic ice cubes are rounded or cracked to ice pieces of irregular form or into ice chips under the influence of gravity by the weight of other ice cubes during storage or by forces acting on them during transportation. Additionally, the ice cubes tend to stick to one another to form a bonded ice block of elongated or enlarged size. These phenomena are well known in the art.

The ice chips, i.e. the ice pieces of irregular shape and reduced size, can certainly be used satisfactorily together with normal prismatic ice cubes for some applications such as cooling of fresh fish for the purpose of maintaining freshness or the like. However, a mixture of normal prismatic ice cubes and ice chips presents problems in some other uses. By way of example, in service industries such as hotels, restaurants and the like, drinks on the rocks, soft drinks, cooling beverages, etc. with ice cubes placed therein are often ordered by customers. In that case, if a large amount of the ice chips such as mentioned above are admixed, the customers may get the impression that there is some problem with the quality of the beverage itself.

For this reason, there exists a demand for supplying normal prismatic ice cubes by sorting out as much of the ice chips as possible. However, the prior art ice transporting apparatuses in which the conveyors, buckets or rakes are used can not satisfy the above-mentioned requirement because the ice chips are indiscriminately supplied with the normal ice cubes.

SUMMARY OF THE INVENTION

Accordingly, it is an object of the present invention to provide an ice lift apparatus which can be installed within a narrow space without difficulty and is capable of supplying ice cubes or pellets with ice chips being sorted out as much as possible.

In view of the above and other objects which will become more apparent as the description proceeds, there is provided according to an aspect of the present invention an ice lift apparatus which receives ice cubes of substantially rectangular prismatic or cubic shape and substantially uniform size each having a longest side of a length D for thereby transporting the ice cube upwardly along a vertical ice transporting section, which apparatus comprises an endless transporting member provided with a number of transverse bars at a predetermined space therebetween and mounted so as to be capable of running circulatively along the vertical ice transporting section, and a supporting guide plate disposed along a climb path of the transverse bars with a predetermined distance L therefrom, wherein the predetermined distance L between the climbing path of the transverse bars and the supporting guide plate is so selected as to fall within a range of less than the length D and greater than or equal to ⅓ to ⅔ of the length D of the longest side of the ice cubes.

In operation of the ice lift apparatus in which the distance L mentioned above is established for normal rectangular prismatic ice cubes having a longest side D, any prismatic ice cubes that have fallen in the space defined between the adjacent transverse bars are conveyed toward the vertical ice transporting section under the thrust exerted by the transverse bars. In these spaces, there exist not only normal prismatic ice cubes but also ice chips of reduced size which result from melting and/or cracking of the normal ice cubes. These ice chips are equally conveyed toward the vertical ice transporting section.

However, in the vertical ice transporting section, the ice chips can not rest on the transverse bars owing to the dimensional relation and are prevented from being positively conveyed upwardly by the transverse bars. Of course, ice chips tend to be passively pushed upwardly by riding on underlying normal ice cubes. However, because of the irregular or abnormal shapes of the ice chips as well as the many voids that exist within the spaces between the bars, the ice chips are in a very unstable state and are likely to drop from the vertical ice transporting section as a result of vibrations in the endless transporting member and inertial forces to which the ice chips are subjected due to abrupt changes in the traveling direction upon transition from the horizontal to the vertical ice transporting section. In this way, the ice chips are sorted out from the normal prismatic ice cubes.

The ice chips may stick to one another to form elongated or enlarged ice cubes. These elongated ice cubes easily fall from the vertical ice transporting section when the longitudinal axis of the bonded ice cube runs along the direction of transport. If the longitudinal axis of the bonded ice cube extends orthogonally to the transporting direction, the center of gravity of such bonded ice cube will generally be positioned outside of the transverse bar, whereby these ice cubes also drop from the vertical ice transporting section. Thus, the ice chips can effectively be sorted out from the normal ice cubes in the course of vertically upward transportation.

Other objects, advantages and novel features of the present invention will become more apparent from the following detailed description of preferred or exemplary embodiments thereof, when considered in conjunction with the accompanying drawings.

DESCRIPTION OF THE PREFERRED EMBODIMENTS

In the following, the present invention will be described in detail in conjunction with exemplary or preferred embodiments thereof by reference to the drawings, in which like or corresponding parts are denoted by like reference symbols throughout the several figures.

Figure 1:
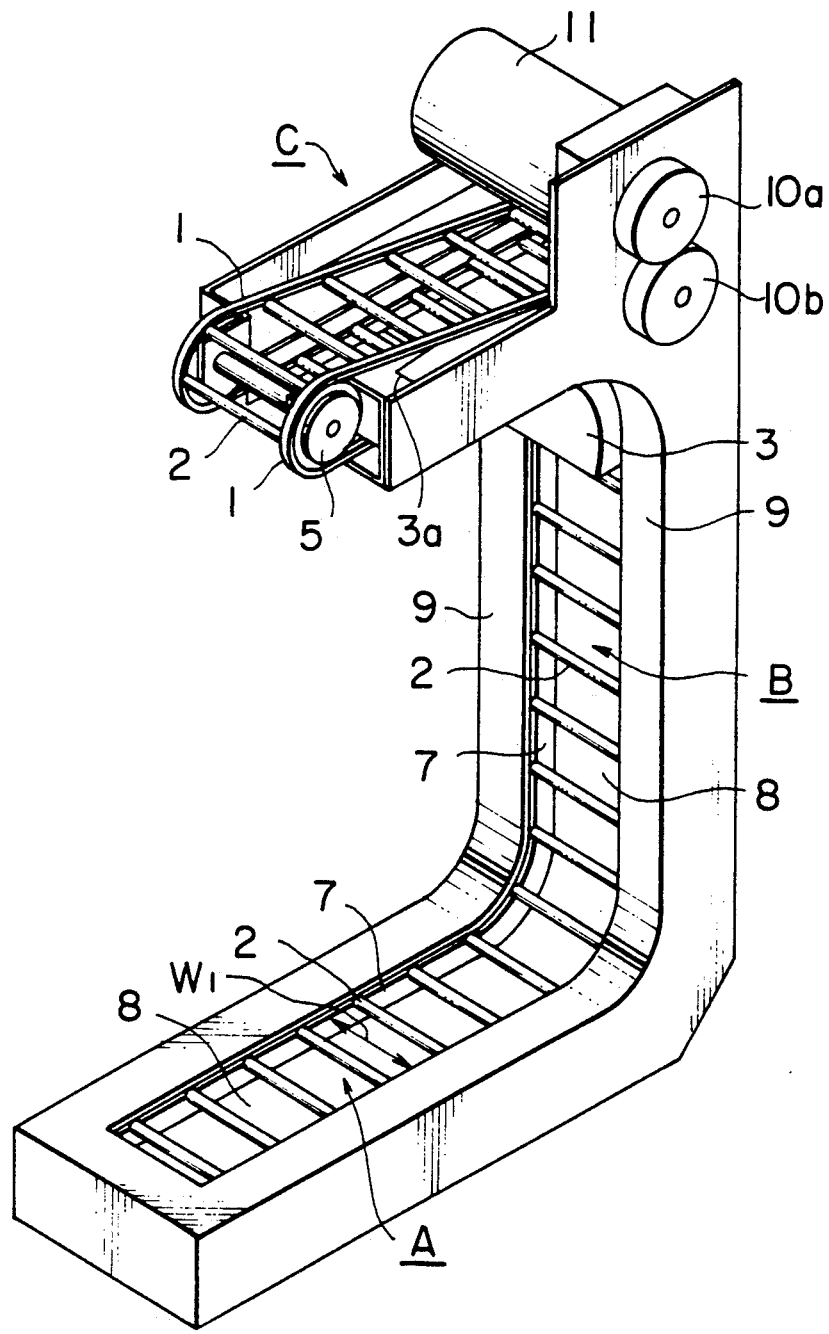
FIG. 1 is a schematic perspective view showing generally a structure of the ice lift apparatus according to an embodiment of the present invention.

Referring to FIG. 1 which shows a general arrangement of an ice lift apparatus according to an embodiment of the present invention, the apparatus includes a horizontal ice transporting section A disposed at bottom, a vertical ice transporting section B extending vertically upwardly from the bottom ice transporting section A (at an angle which need not necessarily be a right angle) and an ice discharge section C inclined upwardly at a small angle. Ice pellets or cubes are loaded on the ice lift apparatus at the horizontal transporting section A and carried upwardly through the vertical transporting section B to be discharged from the ice lift apparatus at the discharge section C. Although the horizontal transporting section A is shown as being constructed integrally with the vertical transporting section B in the case of the illustrated embodiment, it should be understood that the horizontal transporting section A may be implemented separately from the vertical transporting section B depending on the intended application. In this case, the horizontal transporting section A may be replaced by conventional oblique guide means or transporting mechanisms known heretofore in the art substantially to the same effects. The ice lift apparatus of the structure described above is disclosed in U.S. Pat. No. 5,105,631 cited hereinbefore, the contents of which are herein incorporated by reference.

A pair of endless belts or chains 1, running circulatively along the sections A, B and C of the ice lift apparatus described above are connected to each other by a number of transverse bars 2 mounted with a predetermined space therebetween which is selected in consideration of the shape and the size of ice pellets or cubes to be transported. The endless transportation member composed of these chains 1 and the transverse bars 2 is enclosed within a frame 9 which also serves as a cover and is supported movably by means of guide sprockets 5, driving sprockets (not shown) driven by drive gears 10a, 10b, suitable rails (not shown) and a guide plate 8 (supporting guide plate) so as to move endlessly along the sections A, B and C. The driving gears 10a, 10b in turn are rotationally driven by an electric motor 11. With this arrangement, the endless ice transporting member composed of the chains 1 and the transverse bars 2 can transport ice cubes while running circulatively along the sections A, B and C. At this juncture, it is further to be noted that side guide plates 7 are disposed at inner sides of the chains 1, respectively, in opposition to each other with a space or width $W_1$ so that the transverse bars 2 are sandwiched between the side guide plates 7.

Figure 2:
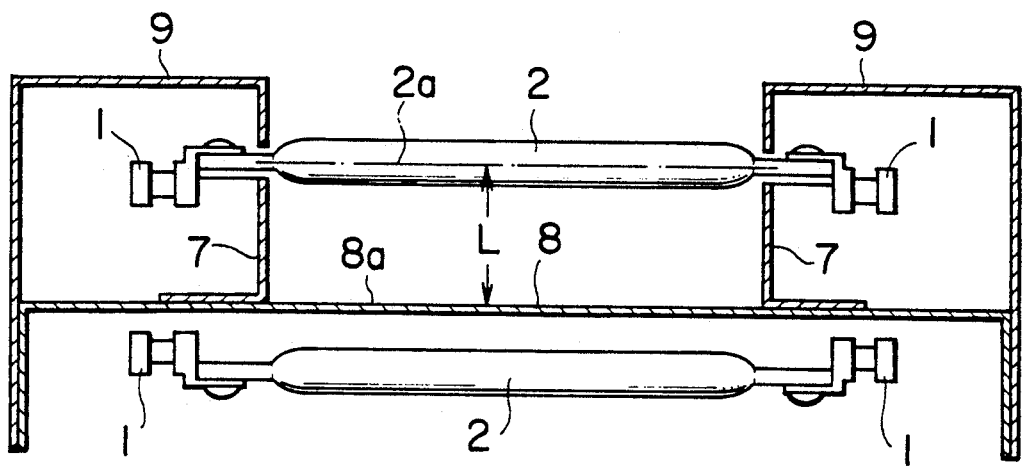
FIG. 2 is a cross-sectional view of a vertical ice transporting section of the ice lift apparatus shown in FIG. 1.

FIG. 2 is an enlarged cross-sectional view showing the vertical ice transporting section B in detail. As can be seen from this figure, a pair of frames 9 each bent substantially in a L-like cross-section are mounted with a distance therebetween which is slightly greater than the width or span $W_1$ mentioned above and cooperate with the side guide plates 7 to enclose therein those portions of the chains 1 which extend along a climbing path (i.e. the chain portions moving upwardly) and end portions of the associated transverse bars located on this climbing path, while enclosing completely the chain portions and the transverse bars which are on the return path (i.e. the chain portions moving downwardly) through cooperation with the guide plate 8. Parenthetically, the horizontal ice transporting section A may be implemented in the same structure as the vertical ice transporting section B described above. In that case, the chains 1 lying on the horizontal ice transporting section should preferably be supported from the underside by suitable means such as rails (not shown). Needless to say, the chains 1 in the vertical ice transporting section B may also be supported by other suitable means such as rails.

Although not shown in the drawings, guide means which may be in the form of guide sprockets, bent rails or the like are provided at a lower curved corner positioned between the horizontal ice transporting section A and the vertical ice transporting section B and an upper curved corner between the vertical ice transporting section B and the ice discharge section C for allowing the chains 1 and the transverse bars 2 to run circulatively along these curved corner portions. Accordingly, a distance L between the longitudinal center axis 2a of the transverse bar 2 and the outer surface 8a of the guide member 8 is virtually determined by the positions of the upper and lower guide means.

Figure 3:
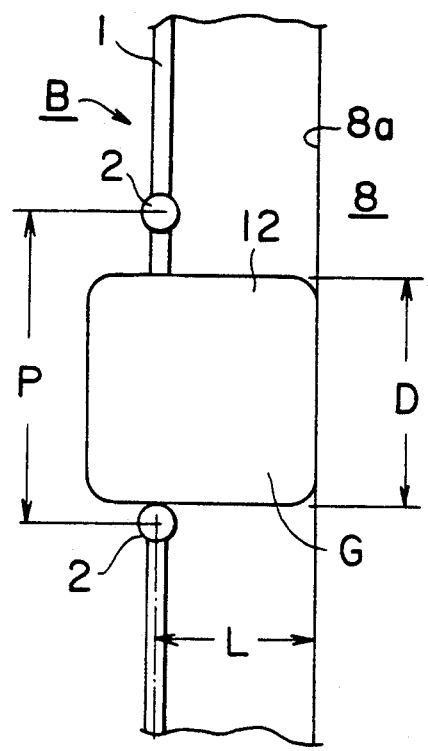
FIG. 3 is a fragmental longitudinal sectional view showing a major portion of the vertical ice transporting section in the ice lift apparatus shown in FIG. 1.

FIG. 3 shows schematically a portion of the vertical ice transporting section B in a vertical sectional view. As can best be seen in this figure, individual ice cubes 12 resting on the transverse bar 2 are transported in the direction indicated by an arrow while being supported by the outer surface 8a of the guide member 8 in cooperation with the transverse bar 2. Accordingly, so long as the center of gravity G of the prismatic ice cube 12 does not lie outside of its line of contact with the transverse bar 2 (i.e. lies at the left-hand side as viewed in FIG. 3), the ice cube 12 can be transported upwardly by the transverse bar 2.

On the other hand, assume that the length of the longest side of a normal or regular prismatic ice cube delivered from an ice making machine installed integrally within or separately from an ice storage chamber within which the ice lift apparatus according to the invention is installed is represented by D. This dimension or size D may be considered to be virtually the same for all cubes as long as the type of ice making machine is the same, even though some differences may be observed in the dimension D among the ice cubes. In this conjunction, it has been empirically established by taking into account the demands and reactions of numerous customers or users that ice chips which should be inhibited from being delivered from the ice discharge section are preferably those which have the longest side smaller than about 2D/3 or more strictly smaller than about D/2.

In view of the above, the range of values of the distance L between the longitudinal center axis 2a of the transverse bar 2 and the outer surface 8a of the guide plate 8 will be considered. For a normal prismatic ice cube 12, the upper limit value of the distance L is delimited by D because a normal ice cube 12 can not rest on the transverse bar 2 when the distance L exceeds the size D, making it impossible to vertically transport the ice cube upwardly. Further, since it can reasonably be estimated that the center of gravity of the normal ice cube 12 lies approximately at the geometrical center thereof, the lower limit of the distance L for which the center of gravity G can lie internally of the longitudinal center axis 2a of the transverse bar 2 is determined to be approximately D/2. Thus, the range of the distance L which permits the upward transportation of the normal ice cube 12 is given by:

$$D/2 \leq L < D \quad (1)$$

Further, in order to eliminate ice chips or broken ice, the distance L which is empirically determined in consideration of the demands of customers or users should be in a range:

$$L \geq D/2 \sim 2D/3 \quad (2)$$

Thus, it is apparent that the ice lift apparatus can transport only normal ice cubes 12 by setting the range of values which the distance L can assume in accordance with the expressions (1) and (2). Further, bonded ice mass are also prevented from being transported upwardly as they are caused to drop from the ice lift apparatus upon turning of the endless transporting member composed of the chains and the transverse bars at the curved corners mentioned previously. This is because the size of the bonded ice mass falls naturally outside of the ranges mentioned above.

In operation of the ice lift apparatus in which the distance L between the longitudinal center axis 2a of the transverse bar 2 and the outer surface 8a of the guide 8 is selected so as to satisfy the conditions (1) and (2) mentioned above, the ice cubes which have fallen within the spaces defined between the adjacent transverse bars 2 in the horizontal transporting section A are forcibly transported toward the vertical ice transporting section B. In this conjunction, it will readily be understood that the so-called ice chips resulting from melting and/or cracking of the normal ice pieces can also be retained within the spaces between the adjacent transverse bars together with the normal ice cubes to be thereby transported toward the vertical ice transporting section B.

However, the ice chips can not rest on the transverse bars in the vertical ice transporting section and are prevented from being positively transported upwardly because of the dimensional relation between these ice chips and the distance L. Of course, the ice chips may passively be pushed upwardly by the underlying normal ice cube. However, these ice chips are very unstable because of their irregular shapes and the presence of many voids within the transporting space. Consequently, most of the ice chips are made fall from the vertical ice transporting section B by the vibration of the chains 1 and/or inertial force to which the ice chips are subjected upon abrupt changes in the motion in the curved corner, resulting in the amount of ice chips delivered from the discharge port 3a of the discharge section C being decreased significantly. In this way, the sorting-out or screening of ice chips from the normal ice cubes is efficiently effectuated in the vertical ice transporting section B.

In the foregoing, the present invention has been described in conjunction with a preferred embodiment thereof on the assumption that the ice lift apparatus of concern includes a pair of endless chains and a number of transverse bars mounted thereon. However, the present invention is in no way limited to the illustrated embodiment but can be subjected to numerous modifications and versions without departing from the spirit and scope of the invention.

By way of example, in the ice lift apparatus according to the embodiment described above, the pitch P between a pair of the adjacent transverse bars 2 and the width $W_1$ between a pair of the side guide plates 7 are so selected that two prismatic ice cubes 12 of normal-shape and size are transported simultaneously by each of the transverse bars, being juxtaposed to each other within the space defined by these transverse bars 2 and the side guide plates 7, as can be seen from FIGS. 1 and 3. However, the number of ice cubes to be accommodated within the space between the adjacent bars 2 is rather arbitrary. For example, such space may be selected that four or five prismatic ice cubes can be accommodated in a row in the direction of transportation. Further, the cross-section of the transverse bars 2 is not necessarily limited to a circular shape such as shown in FIG. 3 but can take other shape such as square or the like. Also, as shown in FIG. 2, the cross-sectional dimension of the ends of the transverse bars is reduced, at least in the direction normal to the guide plate 8. This enables obtaining a reduced gap between the side guide plates 7 and the corresponding frame 9 for limiting access of ice chips to the chain 1. Additionally, the vertical ice transporting section B need not extend upwardly exactly at a right angle relative to the horizontal but may be inclined relative to the vertical.

Figure 4:
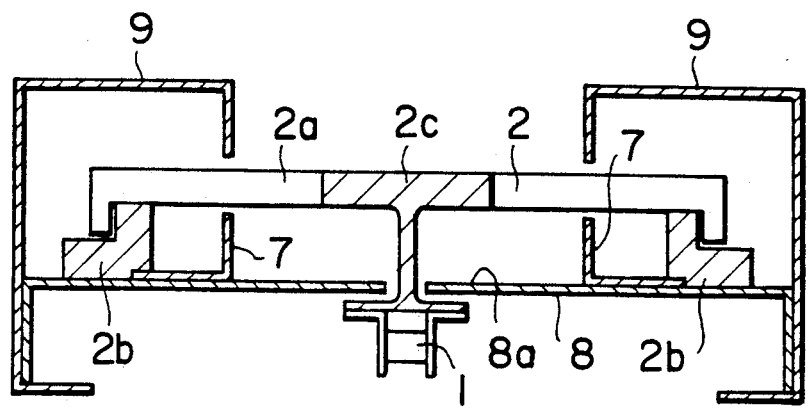
FIG. 4 is a sectional view showing a modified embodiment of an endless transporting member in the ice lift apparatus shown in FIG. 1.

In a modified embodiment of the ice lift apparatus according to the present invention, only one endless chain 1 may be disposed at the center, wherein transverse bars 2 may be secured to both ends of T-like connecting members 2c which are coupled to the endless chain with a predetermined space therebetween, as shown in FIG. 4. In that case, the distance between the longitudinal center axis 2a of the transverse bar 2 (or the bottom surface of the transverse bar 2 as viewed in FIG. 4, when the latter has a square cross-section) and the outer surface 8a of the guide plate 8 is selected as described hereinbefore in conjunction with the preceding embodiment. In FIG. 4, a reference symbol 2b denotes guide rails for the transverse bars 2.

Figure 5:
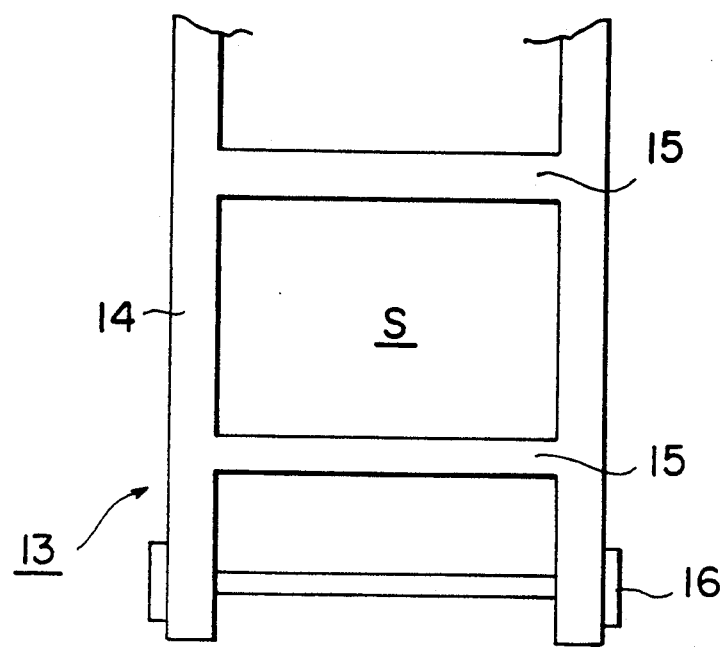
FIG. 5 is a plan view showing another modification of the endless transporting member.
Figure 6:
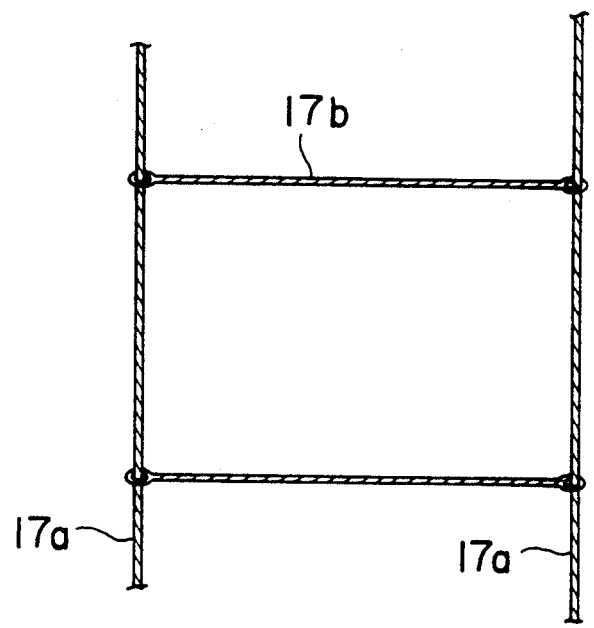
FIG. 6 is a top plan view showing a further version of the endless transporting member.

In the case of the ice lift apparatus shown in FIG. 1, the endless transporting member is composed of the endless chains 1 and the transverse bars 2. However, in view of convenience of cleaning, easy adjustment of length and facility of assembling, the endless transporting member may be constituted by a flexible belt 13 of a suitable material exhibiting an adequate strength in which spaces or cavities S are formed by removing the material so that remaining portions 14 and 15 function as the chains and the transverse bars, as shown in FIG. 5. The portions 14 are fixedly joined at both ends so as to form an endless belt, which is driven by pulleys 16.

Furthermore, from the viewpoint of facilitating the assembling and the length adjustment, a number of wires 17b each of a short length may be connected to a pair of endless wires 17a at a predetermined space between the adjacent wires 17b.

As will now be appreciated from the foregoing description, the basic dimensions of the vertical ice transporting section which constitutes a major part of the ice lift apparatus disposed within the ice chamber are determined in accordance with the expression (2) mentioned previously, whereby the ice transporting apparatus can be realized without need for the use of conveyor, baskets, rakes and the like which extend outwardly from the endless transporting member. Thus, the space occupied by the ice transporting apparatus according to the invention can significantly be reduced, which means that the apparatus can be installed within a narrow space. Additionally, the ice transporting apparatus is imparted with an ice sorting capability to sort the ice cubes during transportation thereof so that prismatic ice cubes or pellets of substantially uniform shape and size can be delivered by virtue of the basic dimension determined in accordance with the expression (2).

Many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

I claim:

1. An ice lift apparatus which receives prismatic ice cubes of substantially uniform shape and size, each having a longest side of length D, for transporting said ice cubes upwardly along a vertical ice transporting section, said apparatus comprising:

an endless transporting member provided with a pair of spaced apart endless chains coupled to each other by a number of transverse bars with a predetermined space therebetween and mounted so as to be capable of running circulatively along said vertical ice transporting section;

a supporting guide plate disposed along a climbing path of said transverse bars with a predetermined distance L therefrom, said predetermined distance L between the climbing path of said transverse bars and said supporting guide plate being so selected as to fall within the range of less than said length D and at least ½ of said length D; and means for encasing said endless chains along at least said vertical ice transporting section, said encasing means including frame structures which encase said chains and which also serve as protecting covers, and a pair of side guide plates disposed in opposition to each other with a widthwise span $W_1$ therebetween at the inner sides of said chains, said frame structures having respective top portions each bent substantially in an inverted L-like configuration and disposed with a distance therebetween which is slightly greater than said widthwise span $W_1$ and which cooperate with said side guide plates to enclose said climbing chains and end portions of said transverse bars connected to said climbing chains.

2. An ice lift apparatus according to claim 1, wherein said distance L represents a distance between a longitudinal center axis of said transverse bar and an outer surface of said supporting guide plate.

3. An ice lift apparatus according to claim 1, wherein pitch P at which said transverse bars are disposed and the widthwise span $W_1$ between said pair of side guide plates are so determined that a plurality of prismatic ice cubes each of an approximately standard size can be transported in juxtaposition to one another.

4. An ice lift apparatus according to claim 1, wherein said encasing means encloses said endless chains and transverse bars along a return path.

5. An ice lift apparatus according to claim 1, wherein end portions of each of said transverse bars have a smaller cross-sectional area than a cross-section of the center portion of said transverse bar.

6. An ice lift apparatus according to claim 5, wherein said cross-sections of said transverse bar are circular.

* * * * *